(12) United States Patent
Kim et al.

(10) Patent No.: US 9,699,402 B2
(45) Date of Patent: Jul. 4, 2017

(54) METHOD AND APPARATUS FOR TRANSMITTING VIDEO SIGNAL

(71) Applicant: NEXTCHIP CO., LTD., Seongnam-si (KR)

(72) Inventors: Do Kyun Kim, Seoul (KR); Jin Gun Song, Seoul (KR)

(73) Assignee: NEXTCHIP CO., LTD., Seongnam-si (KR)

( * ) Notice: Subject to any disclaimer, the term of this patent is extended or adjusted under 35 U.S.C. 154(b) by 0 days.

(21) Appl. No.: 15/031,534

(22) PCT Filed: Feb. 27, 2015

(86) PCT No.: PCT/KR2015/001906
§ 371 (c)(1),
(2) Date: Apr. 22, 2016

(87) PCT Pub. No.: WO2016/085047
PCT Pub. Date: Jun. 2, 2016

(65) Prior Publication Data
US 2016/0337611 A1 Nov. 17, 2016

(30) Foreign Application Priority Data
Nov. 26, 2014 (KR) .................. 10-2014-0166380

(51) Int. Cl.
*H04N 5/374* (2011.01)
*G06T 1/00* (2006.01)
(Continued)

(52) U.S. Cl.
CPC .............. *H04N 7/01* (2013.01); *H04N 5/374* (2013.01); *H04N 5/38* (2013.01); *H04N 7/083* (2013.01);
(Continued)

(58) Field of Classification Search
CPC ...................................................... H04N 19/00
(Continued)

(56) References Cited

U.S. PATENT DOCUMENTS

| 2003/0001976 | A1 | 1/2003 | Sasada | |
|---|---|---|---|---|
| 2008/0290254 | A1* | 11/2008 | Namba | H01J 31/38 250/208.1 |
| 2010/0328318 | A1* | 12/2010 | Honme | G09G 5/42 345/473 |

FOREIGN PATENT DOCUMENTS

| CN | 1267423 A | 9/2000 |
|---|---|---|
| CN | 102724519 A | 10/2012 |

(Continued)

OTHER PUBLICATIONS

PCT International Search Report, PCT/KR2015/001906, dated Jul. 17, 2015, 3 pages.
Korean Notice of Allowance, Application No. 9-5-2015-054691388, dated Aug. 17, 2015, 5 pages.
Korean Office Action, Application No. 9-5-2015-030516984, dated May 8, 20153 pages.
Chinese Office Action, Application No. 201510192608.03, dated Jul. 1, 2016, 6 pages.

*Primary Examiner* — Joel Fosselman
(74) *Attorney, Agent, or Firm* — Daley, Crowley, Mofford & Durkee, LLP

(57) ABSTRACT

Provided is a method and apparatus for transmitting a video signal. The video signal transmission method and apparatus receives a digital video signal from a video sensor, reconfigures the digital video signal by adaptively adjusting at least one of the number of horizontal blank samples and the number of vertical blank lines of the digital video signal so that the digital video signal corresponds to a video standard, converts the reconfigured digital video signal to an analog video signal, and transmits the analog video signal.

19 Claims, 13 Drawing Sheets

(51) Int. Cl.
  *H04N 7/01* (2006.01)
  *H04N 5/38* (2006.01)
  *H04N 7/083* (2006.01)
  *H04N 7/18* (2006.01)
  *H04N 11/14* (2006.01)
  *H04N 9/77* (2006.01)

(52) U.S. Cl.
  CPC ................ *H04N 7/18* (2013.01); *H04N 9/77* (2013.01); *H04N 11/14* (2013.01)

(58) Field of Classification Search
  USPC .......................................... 348/234; 345/473
  See application file for complete search history.

(56) References Cited

FOREIGN PATENT DOCUMENTS

| | | |
|---|---|---|
| KR | 1019970027338 | 6/1997 |
| KR | 20040084390 A | 10/2004 |
| KR | 20060063723 A | 6/2006 |
| KR | 101427552 B1 | 8/2014 |
| KR | 101440260 B1 | 9/2014 |

* cited by examiner

PHOTOGRAPH     GENERATE DIGITAL     GENERATE ANALOG
               VIDEO SIGNAL          VIDEO SIGNAL

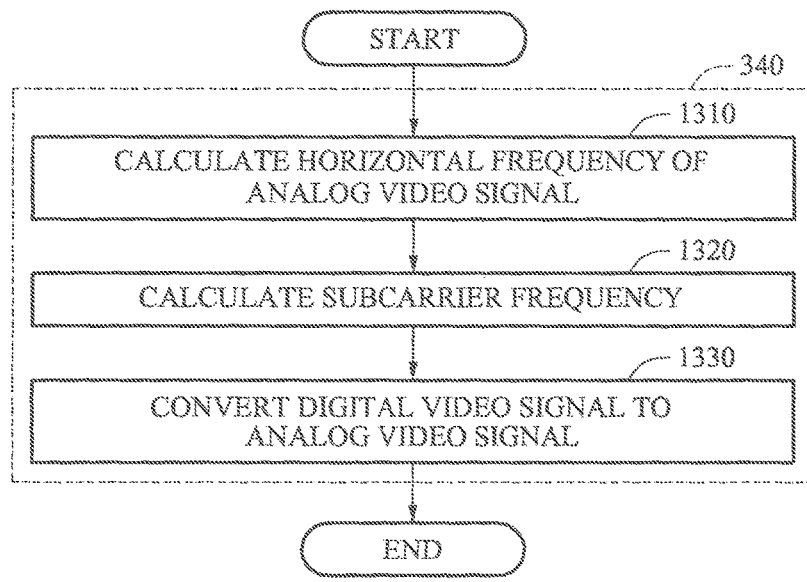

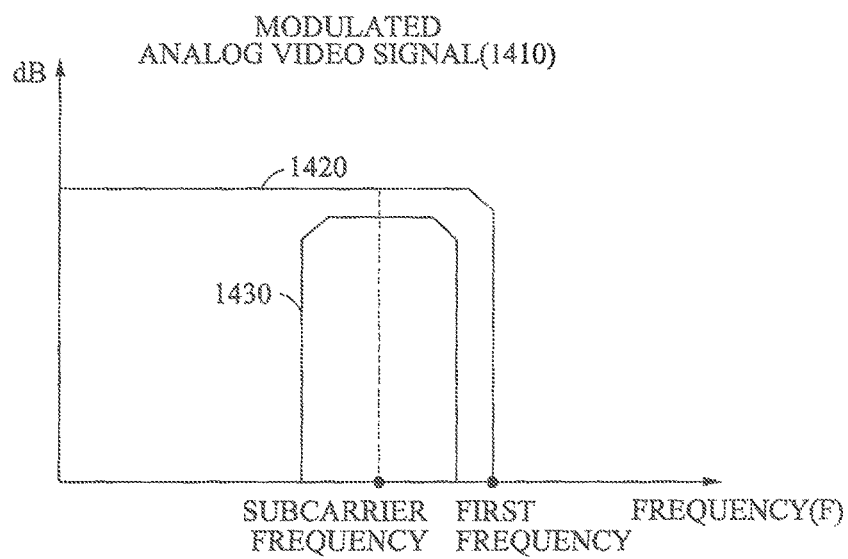

METHOD AND APPARATUS FOR TRANSMITTING VIDEO SIGNAL

CROSS REFERENCE TO RELATED APPLICATION

This application is a U.S. National Stage of PCT application PCT/KR2015/001906 filed in the Korean language on Feb. 27, 2015, and entitled "METHOD AND APPARATUS FOR TRANSMITTING VIDEO SIGNAL," which claims priority to Korean application KR 10-2014-0166380, filed on Nov. 26, 2014, which applications are each hereby incorporated herein by reference in their entireties.

TECHNICAL FIELD

Example embodiments relate to technology for transmitting a video signal, and more particularly, to technology for transmitting an analog video signal by converting a digital video signal to the analog video signal.

RELATED ART

A video transmission method may include a method of using an open circuit and a method of using a closed circuit. Since a video transmission method using an open circuit is to transmit video signals to a plurality of unspecific users, a standardized scheme may be employed to transmit a video. On the other hand, since a video transmission method using a closed circuit is to transmit a video signal only to a specific user, only the specific user may be aware of a video signal transmission scheme.

In general, a composite signal used in a closed-circuit system follows a standard method about an analog color television (TV). Since the standard method uses a limited frequency band, an alternating color issue and a luminance inclusion issue may occur.

Korean Patent Publication No. 10-2006-0063723, published on Dec. 5, 2005, discloses the invention relating to a video signal processing device and a video signal transmission method. This invention may be applied to display a national television system committee (NTSC)-based video signal, thereby effectively avoiding displaying of an unnatural edge and efficiently processing a video signal having a relatively high frame frequency through a simple configuration. In the published invention, a center value of a temporal axis in a single frame of a color difference signal is set to be closest to a center value of a temporal axis in a plurality of frames of a luminance signal corresponding to the color difference signal, and the single frame of the color difference signal is allocated to the plurality of frames of the luminance signal.

DETAILED DESCRIPTION

Technical Subject

Example embodiments provide an apparatus and method for transmitting a video signal Example embodiments also provide an apparatus and method for transmitting an analog video signal by converting a digital video signal to the analog video signal.

Solution

According to an aspect, there is provided a video signal transmission method including receiving a digital video signal from a video sensor, reconfiguring the digital video signal by adaptively adjusting at least one of the number of horizontal blank samples and the number of vertical blank lines of the digital video signal so that the digital video signal corresponds to a video standard, converting the reconfigured digital video signal to an analog video signal, and transmitting the analog video signal.

The video signal transmission method may further include generating the digital video signal using the video sensor.

The generating of the digital video signal may include receiving information about a resolution of a digital video, and generating the digital video to correspond to the resolution.

The reconfiguring may include determining at least one of the number of horizontal blank samples, the number of vertical blank lines, a frame rate, and a scanning scheme based on the received digital video signal, and reconfiguring the digital video signal based on at least one of the number of horizontal blank samples and the number of vertical blank lines.

The converting may include determining a system frequency of the analog video signal based on at least one of the number of horizontal blank samples, the number of vertical blank lines, and the frame rate, and generating the analog video signal using the system frequency.

The system frequency may be determined by multiplying the number of samples in a single horizontal line, the number of vertical lines, and the frame rate.

The reconfiguring of the digital video signal based on at least one of the number of horizontal blank samples and the number of vertical blank lines may include adjusting the number of samples in each horizontal line of the digital video signal to include the number of horizontal blank samples, and adjusting the number of vertical lines of the digital video signal to include the number of vertical blank lines.

The determined number of horizontal blank samples may be an even number.

The reconfiguring of the digital video signal based on at least one of the number of horizontal blank samples and the number of vertical blank lines may include reconfiguring a Y-channel and a CbCr-channel of the digital video signal based on at least one of the number of horizontal blank samples and the number of vertical blank lines.

The reconfiguring of the digital video signal based on at least one of the number of horizontal blank samples and the number of vertical blank lines may include reconfiguring the digital video signal based on the scanning scheme.

The reconfiguring may include displaying additional data on preset area of a vertical blank line of the reconfigured digital video signal.

The converting may include calculating a horizontal frequency of the analog video signal, calculating a subcarrier frequency based on the horizontal frequency, and converting the digital video signal to the analog video signal based on the horizontal frequency and the subcarrier frequency.

The reconfiguring may include displaying additional data on preset area of a vertical blank line of the reconfigured digital video signal.

The converting may include calculating a horizontal frequency of the analog video signal, calculating a subcarrier frequency based on the horizontal frequency, and converting the digital video signal to the analog video signal based on the horizontal frequency and the subcarrier frequency.

The converting of the digital video signal to the analog video signal based on the horizontal frequency and the subcarrier frequency may include modulating a color difference signal of the analog video signal based on the subcarrier frequency.

According to another aspect, there is provided an apparatus for transmitting a video signal, the apparatus including a communicator configured to receive a digital video signal from a video sensor, and to transmit an analog video signal, and a processor configured to reconfigure the digital video signal by adaptively adjusting at least one of the number of horizontal blank samples and the number of vertical blank lines of the digital video signal so that the digital video signal corresponds to a video standard, and to convert the reconfigured digital video signal to the analog video signal.

The processor may be further configured to determine at least one of the number of horizontal blank samples, the number of vertical blank lines, a frame rate, and a scanning scheme based on the received digital video signal, and to reconfigure the digital video signal based on at least one of the number of horizontal blank samples and the number of vertical blank lines.

The processor may be further configured to display additional data on a preset area of a vertical blank line of the reconfigured digital video signal.

The processor may be further configured to calculate a horizontal frequency of the analog video signal, to calculate a subcarrier frequency based on the horizontal frequency, and to convert the digital video signal to the analog video signal based on the horizontal frequency and the subcarrier frequency.

Effect

According to example embodiments, there may be provided a video signal transmission apparatus and method.

Also, according to example embodiments, there may be provided an apparatus and method that may transmit a video signal by converting a digital video signal to an analog video signal.

Also, according to example embodiments, there may be provided an apparatus and method that may adaptively reconfigure digital video signal having various resolutions.

BRIEF DESCRIPTION OF DRAWINGS

FIG. 13 is a flowchart illustrating a method of converting a digital video signal to an analog video signal according to example embodiments; and FIG. 14 illustrates an example of an analog video signal in which a color difference signal is modulated according to example embodiments.

MODE

Figure 1:
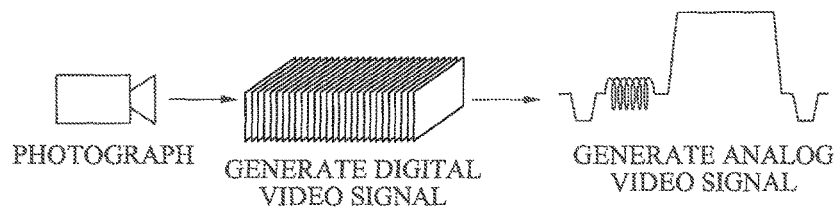
FIG. 1 illustrates an example of a flow of generating an analog video signal according to example embodiments.

Hereinafter, some example embodiments will be described in detail with reference to the accompanying drawings. Like reference numerals in the drawings refer to like elements throughout the present specification.

Various modifications may be made to the example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprise/include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, the term "digital video" may be interpreted as the same meaning as the term "digital video data" or "digital video signal". The term "analog video" may be interpreted as the same meaning as the term "analog video signal".

FIG. 1 illustrates an example of a flow of generating an analog video signal according to example embodiments.

A video sensor may generate an image by photographing a scene. The image refers to a digital frame generated using a digital method. A plurality of frames constitutes a digital video. That is, the video sensor may generate a digital video by photographing a plurality of scenes.

According to an aspect, the video sensor may be an imaging device used for a closed circuit television (CCTV) system. For example, the video sensor may be a monitoring camera.

A method of providing the generated digital video to a receiver may include a digital method and an analog method. The digital method may directly transmit the digital video. The analog method may convert a digital video signal to an analog video signal, and may transmit the analog video signal.

A method of transmitting the digital video using the analog method will be described with reference to FIGS. 2 through 14.

Figure 2:
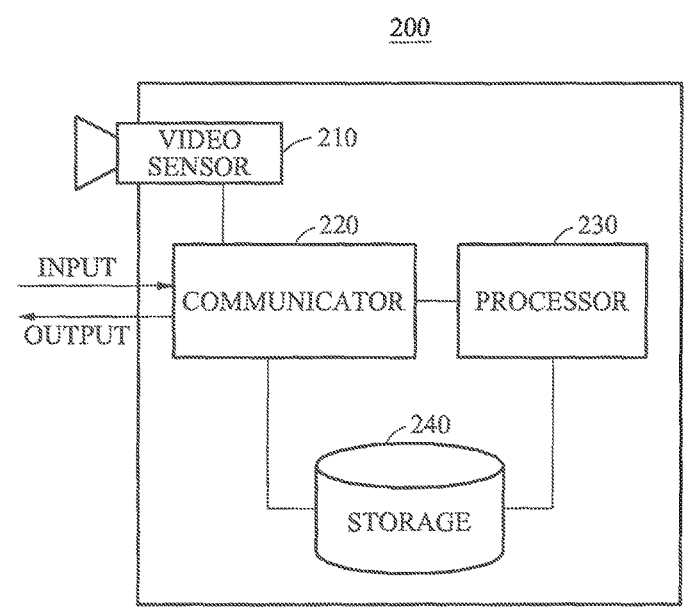
FIG. 2 is a block diagram illustrating a configuration of a video signal transmission apparatus according to example embodiments.

FIG. 2 is a block diagram illustrating a configuration of a video signal transmission apparatus according to example embodiments.

Referring to FIG. 2, a video signal transmission apparatus 200 includes a communicator 220 and a processor 230. The video signal transmission apparatus 200 may further include a video sensor 210 and a storage 240.

The video sensor 210 may correspond to the video sensor of FIG. 1. For example, the video sensor 210 may be an imaging device using a complementary metal-oxide semiconductor (CMOS).

The communicator 220 may be connected to an external device to transmit and receive data.

The processor 230 may process data received at the communicator 220 or data stored in the storage 240.

The storage 240 may store data received at the communicator 220 or data processed at the processor 230.

The video sensor 210, the communicator 220, the processor 230, and the storage 240 will be described with reference to FIGS. 3 through 14.

Figure 3:
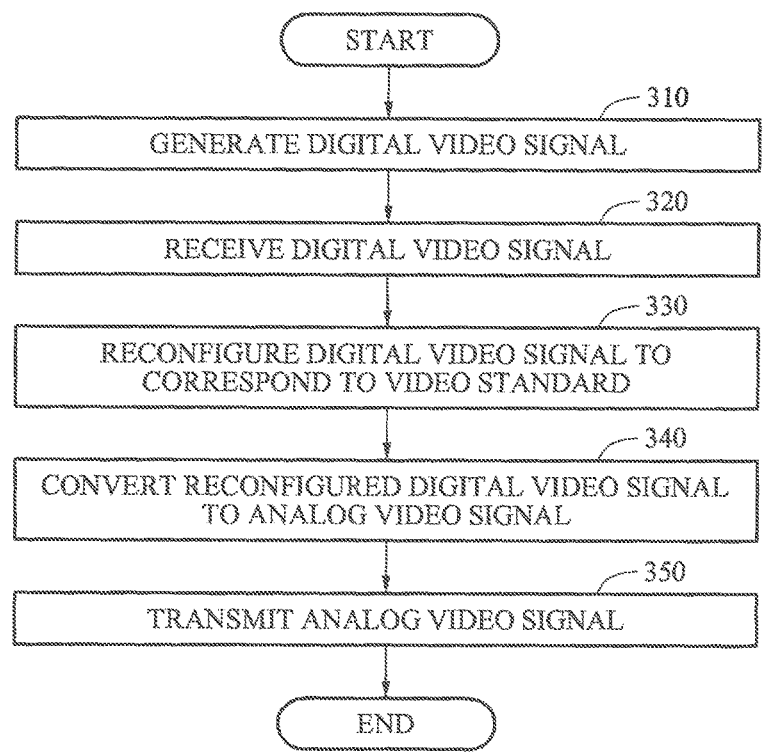
FIG. 3 is a flowchart illustrating a video signal transmission method according to example embodiments.

FIG. 3 is a flowchart illustrating a video signal transmission method according to example embodiments.

In operation 310, the video sensor 210 may generate a digital video by photographing a scene. The video sensor 210 may generate the digital video based on a sampling clock. The digital video may include one or more frames.

For example, the video sensor 210 may photograph a scene at a variety of resolutions. As another example, the video sensor 210 may convert the photographed digital video based on a variety of resolutions.

For example, a variety of resolutions may include 1024× 600, 1280×1024, and 1280×768.

In operation 320, the communicator 220 may receive a digital video signal from the video sensor 210. The digital video signal may be a signal or data about the digital video.

In operation 330, the processor 230 may reconfigure the digital video signal so that the digital video signal corresponds to a video standard. For example, the processor 230 may reconfigure the digital video signal by adaptively adjusting at least one of horizontal blank samples and the number of vertical blank lines of the digital video signal so that the digital video signal corresponds to the video standard.

The video standard may be preset. For example, the video standard may be set based on a coaxial cable through which an analog video signal is transmitted. The video standard may be preset not to exceed a transmittable maximum bandwidth of the coaxial cable.

A method of reconfiguring the digital video signal will be described with reference to FIGS. 5 through 10.

In operation 340, the processor 230 may convert the reconfigured digital video signal to the analog video signal.

A method of converting the reconfigured digital video signal to the analog video signal will be described with reference to FIGS. 11 through 14.

Figure 4:
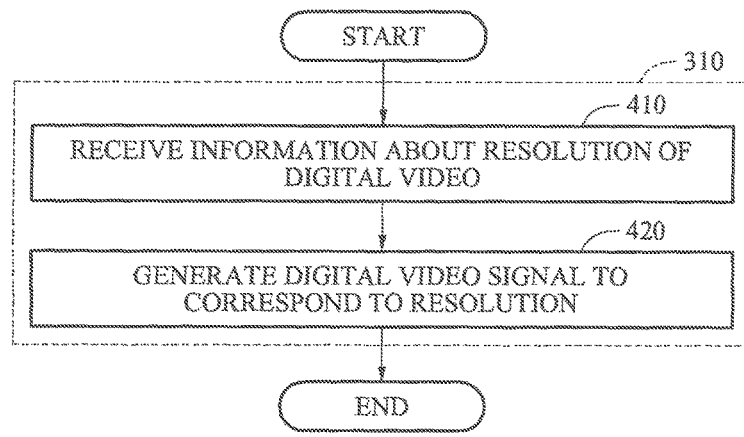
FIG. 4 is a flowchart illustrating a method of generating a digital video signal according to example embodiments.

FIG. 4 is a flowchart illustrating a method of generating a digital video signal according to example embodiments.

Operation 310 of FIG. 3 may include operations 410 and 420 of FIG. 4.

In operation 410, the video sensor 210 may receive information about a resolution of the digital video.

According to an aspect, the video sensor 210 may receive information about the resolution through the communicator 220. For example, a user of a CCTV system may transmit information about the resolution to the communicator 220 through a video signal reception apparatus connected to the video signal transmission apparatus 200.

In operation 420, the video sensor 210 may generate the digital video to correspond to the resolution.

Through operations 410 and 420, the video sensor 210 may generate the digital video having a variety of resolutions.

Figure 5:
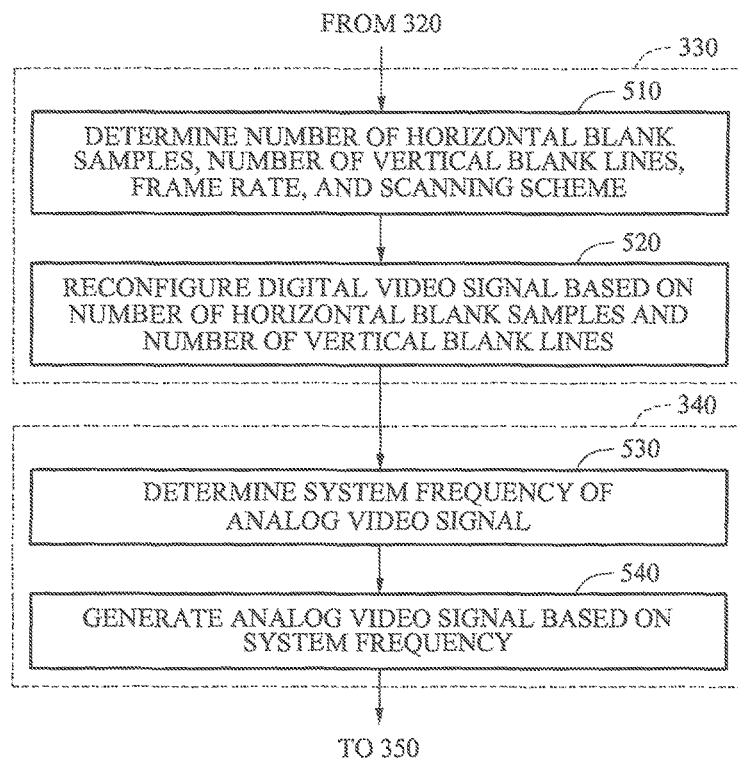
FIG. 5 is a flowchart illustrating a method of reconfiguring a digital video signal according to example embodiments.

FIG. 5 is a flowchart illustrating a method of reconfiguring a digital video signal according to example embodiments.

Operation 330 of FIG. 3 may include operations 510 and 520.

In operation 510, the processor 230 may determine at least one of the number of horizontal blank samples, the number of vertical blank lines, a frame rate, and a scanning scheme of the digital video signal that is reconfigured based on the received digital video signal.

The number of horizontal blank samples, the number of vertical blank lines, the frame rate, and the scanning scheme of the reconfigured digital video signal will be described with reference to FIG. 6.

In operation 520, the processor 230 may reconfigure the digital video signal based on the number of horizontal blank samples and the number of vertical blank lines. For example, the processor 230 may reconfigure the digital video signal by adjusting the number of samples of the received digital video signal.

A method of reconfiguring the digital video signal will be described with reference to FIG. 7.

Operation 340 of FIG. 3 may include operations 530 and 540.

In operation 530, the processor 230 may determine a system frequency of an analog video signal based on the number of horizontal blank samples, the number of vertical blank lines, and a frame rate.

The system frequency may be a frequency at which the analog video signal is generated. The system frequency may be a system clock.

For example, the system frequency may be determined by multiplying the number of samples in a single horizontal line, the number of vertical lines, and the frame rate.

For example, the system frequency may be determined based on Table 1. In Table 1, a numerical number may denote the number of samples of each item.

TABLE 1

| System frequency (Hz) | Horizontal line | Horizontal blank | Active data | Number of vertical lines | Number of vertical blank lines | Number of active data lines | frame rate |
|---|---|---|---|---|---|---|---|
| 55800000 | 2000 | 400 | 1600 | 930 | 30 | 900 | 30 |

In operation 540, the processor 230 may generate the analog video signal based on the system frequency.

For example, the processor 230 may generate the analog video signal by converting samples or data of the reconfigured digital video signal to the analog video signal based on the system frequency.

Figure 6:
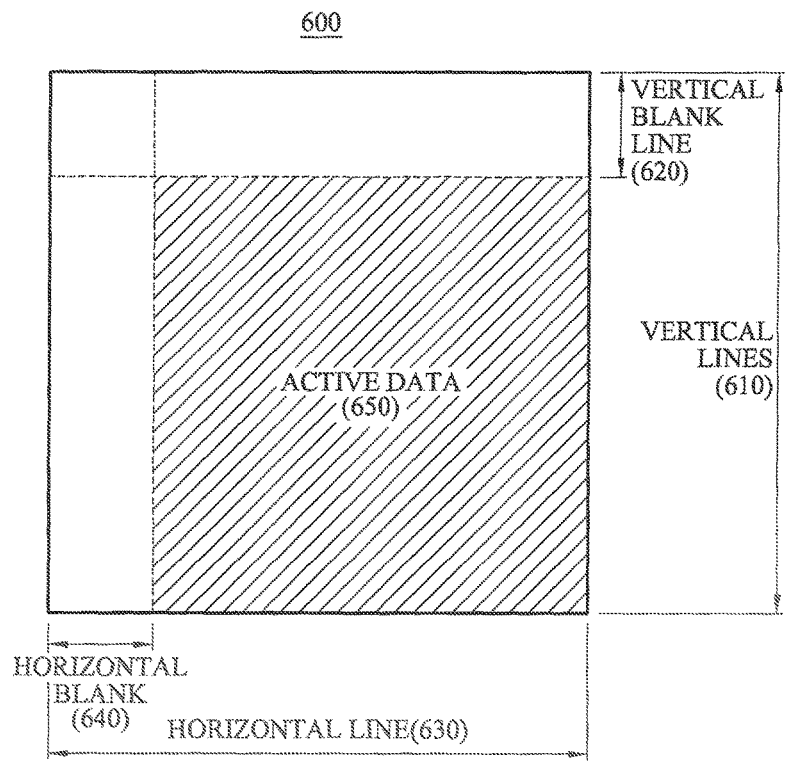
FIG. 6 illustrates an example of a frame of a digital video according to example embodiments.

FIG. 6 illustrates an example of a frame of a digital video according to example embodiments.

A frame 600 of a digital video may be a single image. The frame 600 of the digital video may include active data 650 that represents a scene and other data.

A preset height from an uppermost end of the frame 600 of the digital video may be a vertical blank line 620. The vertical blank line 620 may be configured using a plurality of lines. The vertical blank line 620 may be used to distinguish a plurality of flames from one another.

A preset interval from a leftmost side of the frame 600 of the digital video may be a horizontal blank line 640. The horizontal blank line 640 may be used to maintain the horizontal line 630 at a constant interval.

A resolution may relate to the number of pixels of the active data 650. For example, the resolution may be a value acquired by multiplying the number of pixels included in the active data 650 among the horizontal lines 630 and the number of vertical lines included in the active data 650 among the vertical lines 610.

Although at least one of the number of horizontal blank samples denoting the number of samples in the horizontal blank line 640 and the number of vertical blank lines 620 varies, the resolution may not vary. The sample may be data included in each horizontal line 630.

According to an aspect, although the frame 600 of the digital video has a variety of resolutions, the processor 230 may reconfigure the frame 600 of the digital video frame by adaptively adjusting at least one of the number of samples in the horizontal blank line 640 and the number of vertical blank lines 620.

Figure 7:
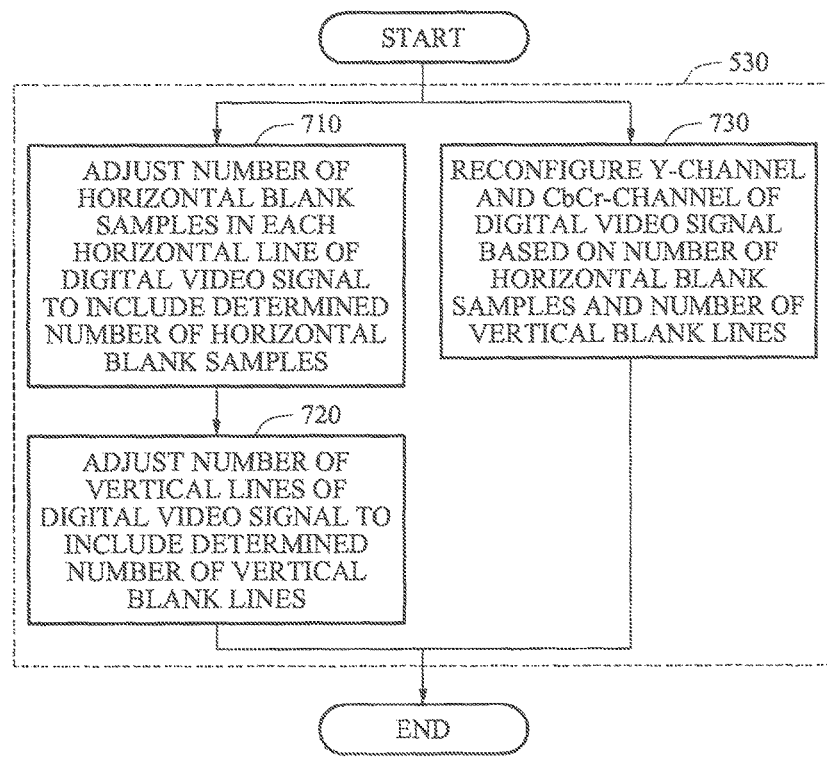
FIG. 7 is a flowchart illustrating a method of reconfiguring a digital video signal based on the number of horizontal blank samples and the number of vertical blank lines according to example embodiments.

FIG. 7 is a flowchart illustrating a method of reconfiguring a digital video signal based on the number of horizontal blank samples and the number of vertical blank lines according to example embodiments.

According to an aspect, operation 520 of FIG. 5 may include operations 710 and 720.

In operation 710, the processor 230 may adjust the number of samples in each horizontal line of the digital video signal to include the determined number of horizontal blank samples.

The processor 230 may adjust the number of samples in the horizontal blank line 640 of FIG. 6 to be the determined number of horizontal blank samples. For example, the processor 230 may adjust the number of samples by removing a portion of the samples in the horizontal blank line 640.

In operation 720, the processor 230 may adjust the number of vertical lines of the digital video signal to include the determined number of vertical blank lines.

The processor 230 may adjust the number of blank lines 610 of FIG. 6 to be the determined number of vertical blank lines. For example, the processor 230 may adjust the number of lines by removing a portion of the vertical lines 610.

According to another aspect, operation 520 of FIG. 5 may include operation 730.

In operation 730, the processor 230 may reconfigure a Y-channel and a CbCr-channel of the digital video signal based on at least one of the number of horizontal blank samples and the number of vertical blank lines.

The Y-channel and the CbCr-channel may be included in each horizontal line of the digital video signal. For example, the Y-channel and the CbCr-channel may be an integrated channel. As another example, the Y-channel and the CbCr-channel may be separate channels each including data.

A method of reconfiguring the Y-channel and the CbCr-channel will be further described with reference to FIG. 8.

Figure 8:
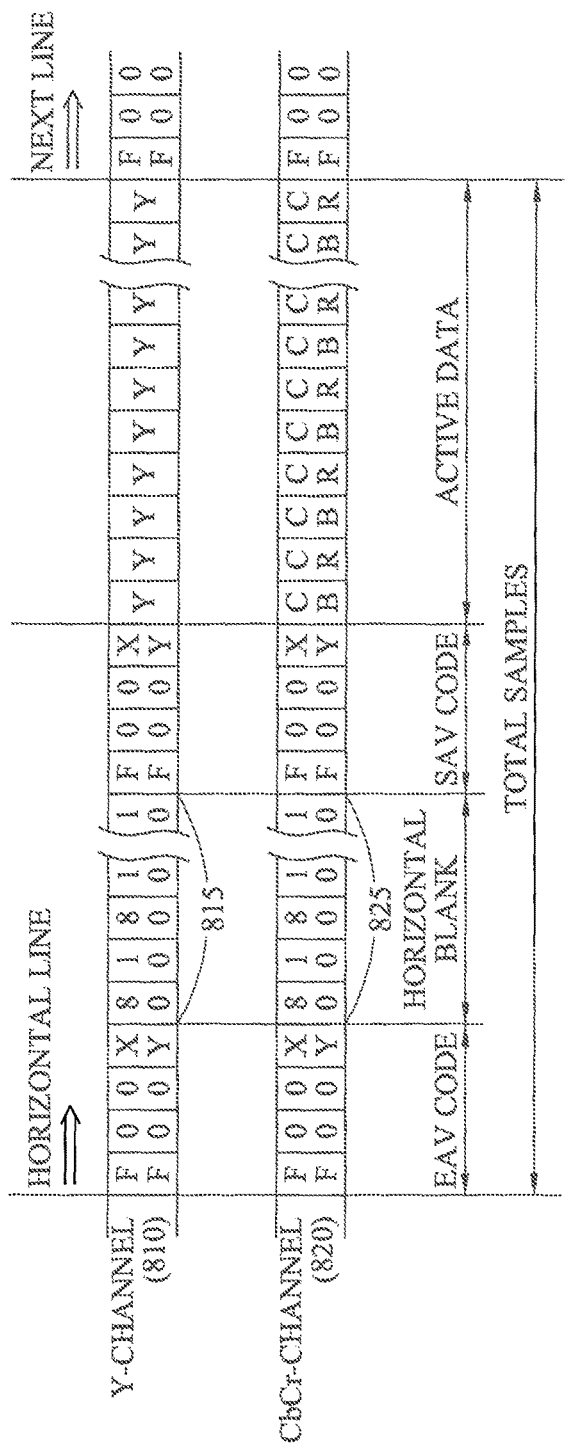
FIG. 8 illustrates an example of reconfiguring a Y-channel and a CbCr-channel based on the number of horizontal blank samples according to example embodiments.

FIG. 8 illustrates an example of reconfiguring a Y-channel and a CbCr-channel based on the number of horizontal blank samples according to example embodiments.

According to an aspect, each horizontal line of the digital video signal may include a Y-channel 810 and a CbCr-channel 820. A ratio of luminance signal Y:Cb signal:Cr signal may be 4:2:2. Each of the Cb signal and the Cr signal may be a color difference signal.

Each of the Y-channel 810 and the CbCr-channel 820 may include an end of active video signal (EAV) code, horizontal blank data, a start of active video signal (SAV) code, and active data.

When the digital video signal are generated, the Y-channel 810 and the CbCr-channel 820 may be paired and generated in parallel.

The EAV code and the SAV code may include the same data or code.

According to an aspect, the number of horizontal blank samples, for example, the number of samples in each of vertical blank lines 815 and 825 may be an even number. For example, the number of samples in each of the vertical blank lines 815 and 825 may be 272 or more.

The processor 230 may reconfigure the Y-channel 810 and the CbCr-channel 820 by adjusting the number of horizontal blank samples, for example, the number of samples in the horizontal blank line 815 of the Y-channel and the number of horizontal blank samples, for example, the number of samples in the horizontal blank line 825 of the CbCr-channel. For example, the processor 230 may adjust the number of samples in the horizontal blank line 815 of the channel and the number of samples in the horizontal blank line 825 of the CbCr-channel so that each of the horizontal blank line 815 of the Y-channel and the horizontal blank line 825 of the CbCr-channel may have the determined number of horizontal blank samples. The determined number of horizontal blank samples may be an even number.

A method of adjusting the number of horizontal blank samples may be to determine a horizontal data timing.

Figure 9:
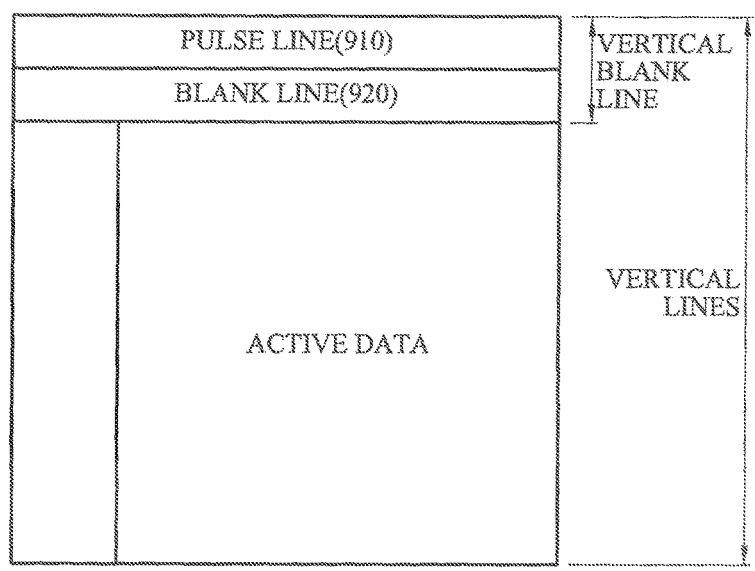
FIG. 9 illustrates an example of a digital video reconfigured based on a scanning scheme according to example embodiments.

FIG. 9 illustrates an example of a digital video reconfigured based on a scanning scheme according to example embodiments.

A video scanning scheme may include a progressive scanning scheme and an interlaced scanning scheme.

In operation 520 of FIG. 5, the processor 230 may reconfigure the digital video signal based on the scanning scheme of the digital video.

FIG. 9 illustrates a digital video 900 reconfigured based on a progressive scanning scheme.

A vertical blank line may include a pulse line 910 and a blank line 920.

The pulse line 910 may include a pre-equalizing pulse, a serration pulse, and a post-equalizing pulse. For example, each of the pr equalizing pulse, the serration pulse, and the post-equalizing pulse may include three lines. The pulse line 910 may include a total of 9 lines.

The blank line 920 may include 11 or more lines. The processor 230 may generate the reconfigured digital video 900 by adjusting the number of blank lines 920.

Adjusting the number of blank lines 920 may be determining a vertical data timing.

According to an aspect, the processor 230 may display additional data on a preset area of a vertical blank line. A method of displaying additional data will be described with reference to FIG. 12.

Figure 10:
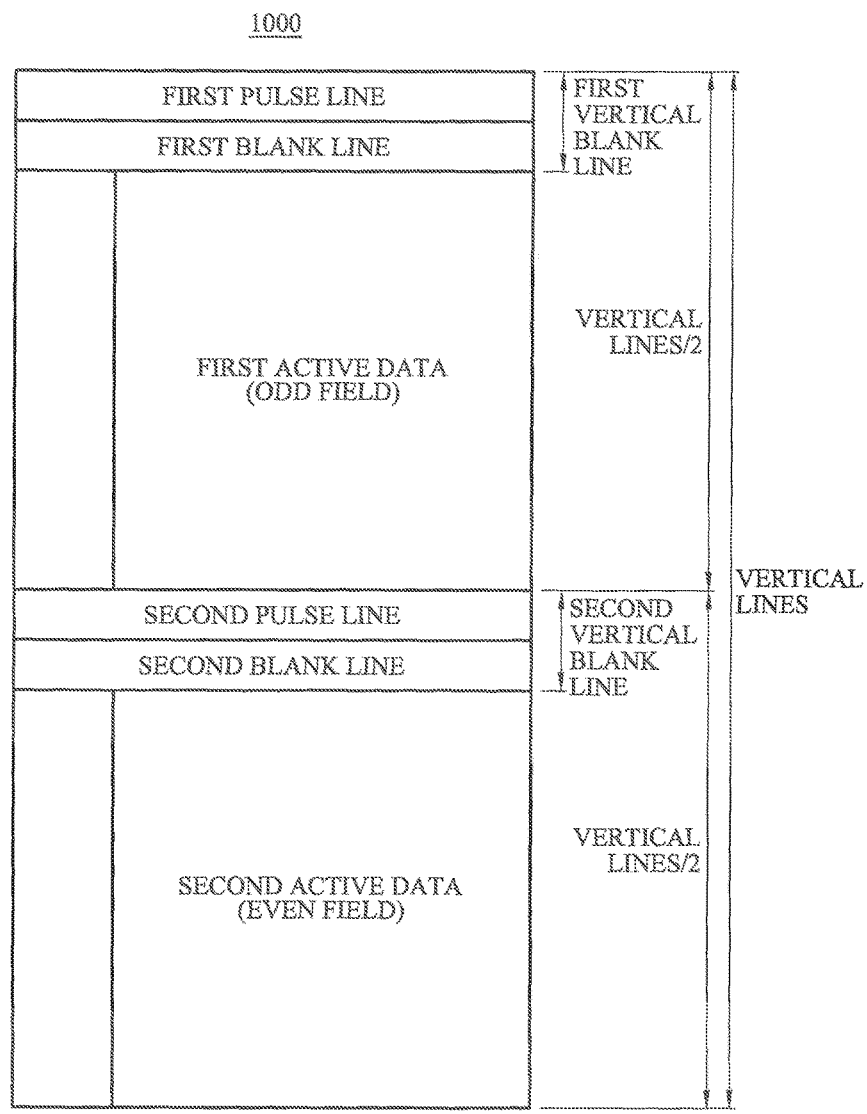
FIG. 10 illustrates another example of a digital video reconfigured based on a scanning scheme according to example embodiments.

FIG. 10 illustrates another example of a digital video reconfigured based on a scanning scheme according to example embodiments.

FIG. 10 illustrates a digital video 1000 reconfigured based on an interlaced scanning scheme.

Referring to FIG. 10, the digital video 1000 may include a first pulse line and a first blank line for first active data, and may include a second pulse line and a second blank line for second active data.

Each of the first pulse line and the second pulse line may include 9 lines.

Each of the first blank line and the second blank line may include 11 or more lines.

Figure 11:
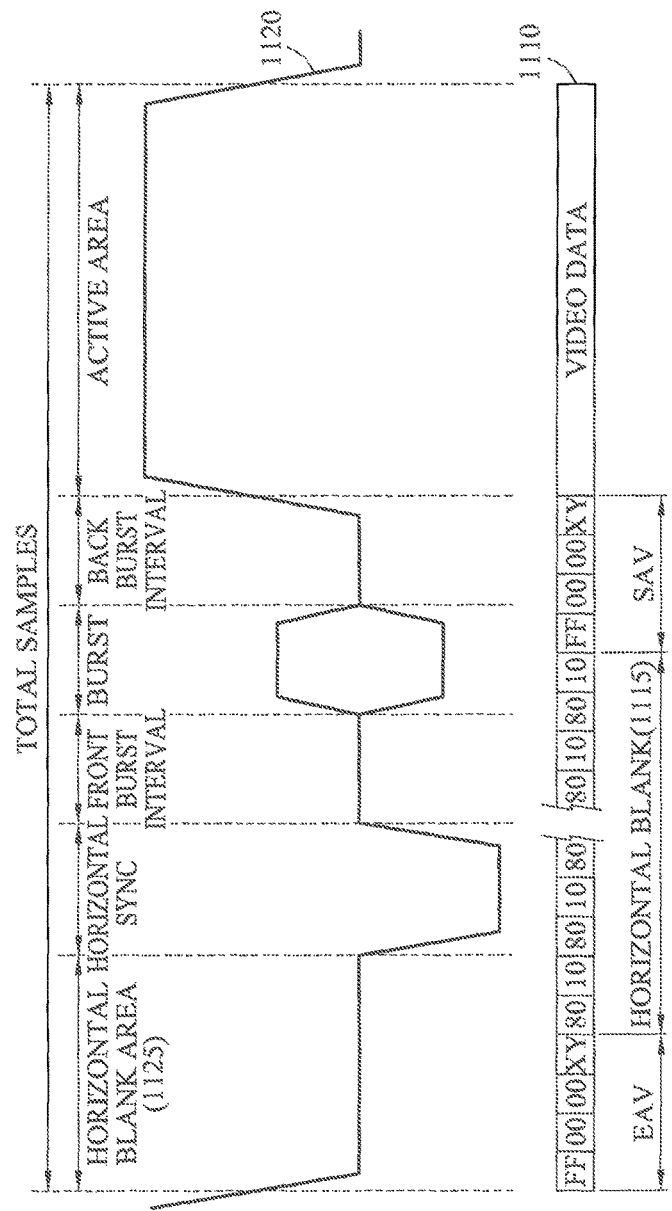
FIG. 11 illustrates an example of a relationship between a digital video signal and an analog video signal according to example embodiments.

FIG. 11 illustrates an example of a relationship between a digital video signal and an analog video signal according to example embodiments.

In operation 340 of FIG. 3, the processor 230 may convert the reconfigured digital video signal to the analog video signal.

According to an aspect, the processor 230 may convert the digital video signal to the analog video signal based on a system frequency.

The processor 230 may convert the digital video signal to the analog video signal by converting each horizontal line of the digital video signal to the analog video signal.

Referring to FIG. 11, the processor 230 may generate a horizontal blank area 1125 of a horizontal line 1120 of an analog video signal corresponding to a horizontal blank area 1115 of a horizontal line 1110 of a digital video signal. For example, the number of samples of the horizontal blank area 1125 may be 20 or more.

According to a decrease in the number of samples in the horizontal blank area 1115, a length of the horizontal blank area 1125 may be reduced.

The processor 230 may generate a horizontal sync, a front burst interval, a burst, and a back burst interval of the analog video signal to correspond to a video standard.

The number of samples in the horizontal sync may be 150 or more.

Each of the number of samples in the front burst interval and the number of samples in the back burst interval may be 20 or more.

The number of samples in the burst may be 70 or more.

A sync and burst area may be a section that includes the horizontal sync, the front burst interval, the burst, and the back burst interval.

Table 2 shows a timing about a horizontal line of an analog video. In Table 2, a numerical number may denote the number of samples of each item.

Here, p of the resolution denotes a progressive scanning scheme.

The processor 230 may generate an active area of the horizontal line 1120 of the analog video signal corresponding to video data or active data of the horizontal line 1110 of the digital video signal.

Figure 12:
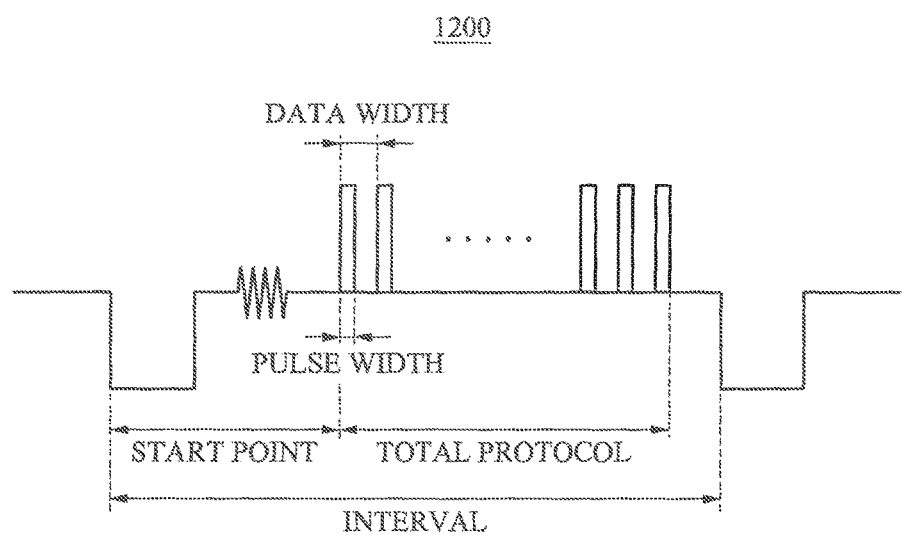
FIG. 12 illustrates an example of additional data displayed on an analog video signal according to example embodiments.

FIG. 12 illustrates an example of additional data displayed on an analog video signal according to example embodiments.

In operation 330 of FIG. 3, the processor 230 may display additional data on a preset area of a vertical blank line of a reconfigured digital video signal. The preset area of the vertical blank line may be a protocol transmission area.

The additional data may be a protocol. That is, the additional data may be data preset between a video transmission apparatus and a video reception apparatus.

When the processor 230 converts the reconfigured digital video signal to the analog video signal in operation 340, the processor 230 may display a protocol on a protocol transmission area 1200 of the analog video signal converted using the displayed additional data. The displayed protocol may be a pulse indicating a bit string. For example, the displayed protocol may use a Manchester code scheme.

A start point and interval of the protocol may be based on a horizontal sync.

FIG. 13 is a flowchart illustrating a method of converting a digital video signal to an analog video signal according to example embodiments.

Operation 340 of FIG. 3 may include operations 1310, 1320, and 1330.

In operation 1310, the processor 230 may calculate a horizontal frequency of the analog video signal.

The horizontal frequency may be a burst frequency.

The horizontal frequency may be calculated according to Equation 1.

$$\text{Horizontal frequency} = 1/(\text{frame rate} * \text{number of vertical lines}) \quad [\text{Equation 1}]$$

In operation 1320, the processor 230 may calculate a subcarrier frequency based on the horizontal frequency.

The subcarrier frequency may be calculated according to Equation 2.

$$\text{Subcarrier frequency} = (2N+1)/2 * \text{horizontal frequency}. \quad [\text{Equation 2}]$$

In Equation 2, N denotes a natural number.

$(2N+1)/2$ folds of the horizontal frequency may be used to avoid interference between a color difference frequency and a luminance frequency of the analog video signal.

Table 3 shows an example of the calculated subcarrier frequency.

TABLE 3

| Vertical lines | Frame rate | Horizontal frequency (Hz) | 2N + 1 | Subcarrier frequency (Hz) |
|---|---|---|---|---|
| 930 | 30 | 27900 | 401 | 5593950 |

TABLE 2

| Resolution | Total number of samples | Horizontal blank area | Sync and burst area | Horizontal sync | Front burst interval | Burst | Back burst interval | Active area | Vertical lines | frame rate |
|---|---|---|---|---|---|---|---|---|---|---|
| 1600 × 900 × 30p | 2000 | 140 | 260 | 150 | 20 | 70 | 20 | 1600 | 930 | 30 |

In operation 1330, the processor 230 may convert the digital video signal to analog video signal based on the horizontal frequency and the subcarrier frequency.

When converting the digital video signal to the analog video signal, the processor 230 may convert the digital video signal to the analog video signal using a frequency corresponding to two times or more of the system frequency to achieve a stable operation.

When converting the digital video signal to the analog video signal, the processor 230 may convert the digital video signal to the analog video signal using a frequency corresponding to four times or more of the subcarrier frequency to achieve a stable operation.

According to an aspect, the processor 230 may modulate a color difference signal of the analog video signal based on the subcarrier frequency. The modulated analog video signal will be described with reference to FIG. 14.

FIG. 14 illustrates an example of an analog video signal in which a color difference signal is modulated according to example embodiments.

Referring to FIG. 14, an analog video signal 1410 modulated at the processor 230 may include a luminance frequency signal 1420 and a modulated color difference frequency signal 1430.

The luminance frequency signal 1420 may have a first frequency bandwidth in which a first frequency is maximum.

According to an aspect, a highest frequency in a bandwidth of the color difference frequency signal 1430 may be lower than the first frequency. That is, the bandwidth of the color difference frequency signal 1430 may be included in the first frequency bandwidth.

When the bandwidth of the color difference frequency signal 1430 is included in the first frequency bandwidth, and when a subcarrier frequency is high, an alternating color issue and a luminance inclusion issue may decrease compared to a standard scheme.

The units and/or modules described herein may be implemented using hardware components, software components, and/or combination of the hardware components and the software components. For example, the apparatuses and the hardware components described herein may be implemented using, for example, a processor, a controller and an arithmetic logic unit (ALU), a digital signal processor, a microcomputer a field programmable array (FPA), a programmable logic unit (PLU), a microprocessor, or one or more general-purpose computers or specific-purpose computers such as any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will be appreciated that a processing device may include multiple processing elements and/or multiple types of processing elements. For example, a processing device may include multiple processors or a processor and a controller. In addition, different processing configurations are possible, such a parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, and DVDs; magneto-optical media such as optical media and floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described hardware devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of transmitting a video signal, the method comprising:
   receiving a digital video signal from a video sensor;
   reconfiguring the digital video signal by adaptively adjusting at least one of the number of horizontal blank samples and the number of vertical blank lines of the digital video signal so that the digital video signal corresponds to a video standard;
   converting the reconfigured digital video signal to an analog video signal; and
   transmitting the analog video signal,
   wherein the reconfiguring comprises displaying additional data on a preset area of a vertical blank line of the reconfigured digital video signal.

2. The method of claim 1, further comprising:
   generating the digital video signal using the video sensor.

3. The method of claim 2, wherein the generating of the digital video signal comprises:
   receiving information about a resolution of a digital video; and
   generating the digital video to correspond to the resolution.

4. The method of claim 1, wherein the reconfiguring comprises:
   determining at least one of the number of horizontal blank samples, the number of vertical blank lines, a frame rate, and a scanning scheme based on the received digital video signal; and
   reconfiguring the digital video signal based on at least one of the number of horizontal blank samples and the number of vertical blank lines.

5. The method of claim 4, wherein the converting comprises:
   determining a system frequency of the analog video signal based on at least one of the number of horizontal blank samples, the number of vertical blank lines, and the frame rate; and generating the analog video signal using the system frequency.

6. The method of claim 5, wherein the system frequency is determined by multiplying the number of samples in a single horizontal line, the number of vertical lines, and the frame rate.

7. The method of claim 4, wherein the reconfiguring of the digital video signal based on at least one of the number of horizontal blank samples and the number of vertical blank lines comprises:
adjusting the number of samples in each horizontal line of the digital video signal to include the number of horizontal blank samples; and
adjusting the number of vertical lines of the digital video signal to include the number of vertical blank lines.

8. The method of claim 4, wherein the determined number of horizontal blank samples is an even number.

9. The method of claim 4, wherein the reconfiguring of the digital video signal based on at least one of the number of horizontal blank samples and the number of vertical blank lines comprises reconfiguring a Y-channel and a CbCr-channel of the digital video signal based on at least one of the number of horizontal blank samples and the number of vertical blank lines.

10. The method of claim 4, wherein the reconfiguring of the digital video signal based on at least one of the number of horizontal blank samples and the number of vertical blank lines comprises reconfiguring the digital video signal based on the scanning scheme.

11. The method of claim 1, wherein the converting comprises:
calculating a horizontal frequency of the analog video signal;
calculating a subcarrier frequency based on the horizontal frequency; and
converting the digital video signal to the analog video signal based on the horizontal frequency and the subcarrier frequency.

12. The method of claim 11, wherein the converting of the digital video signal to the analog video signal based on the horizontal frequency and the subcarrier frequency comprises modulating a color difference signal of the analog video signal based on the subcarrier frequency.

13. The method of claim 1, wherein the converting comprises:
calculating a horizontal frequency of the analog video signal based on the video standard; and
modulating a color difference signal of the analog video signal based on the calculated horizontal frequency.

14. The method of claim 1, wherein the converting comprises converting the digital video signal to the analog video signal to include a bandwidth of a color difference frequency signal of the analog video signal in a bandwidth of a luminance frequency signal of the analog video signal.

15. An apparatus for transmitting a video signal, the apparatus comprising:
a communicator configured to receive a digital video signal from a video sensor, and to transmit an analog video signal; and
a processor configured to reconfigure the digital video signal by adaptively adjusting at least one of the number of horizontal blank samples and the number of vertical blank lines of the digital video signal so that the digital video signal corresponds to a video standard, and to convert the reconfigured digital video signal to the analog video signal,
wherein the processor is further configured to display additional data on a preset area of a vertical blank line of the reconfigured digital video signal.

16. The apparatus of claim 15, wherein the processor is further configured to determine at least one of the number of horizontal blank samples, the number of vertical blank lines, a frame rate, and a scanning scheme based on the received digital video signal, and to reconfigure the digital video signal based on at least one of the number of horizontal blank samples and the number of vertical blank lines.

17. The apparatus of claim 15, wherein the processor is further configured to calculate a horizontal frequency of the analog video signal, to calculate a subcarrier frequency based on the horizontal frequency, and to convert the digital video signal to the analog video signal based on the horizontal frequency and the subcarrier frequency.

18. The apparatus of claim 15, wherein the processor is further configured to calculate a horizontal frequency of the analog video signal based on the video standard, and to modulate a color difference signal of the analog video signal based on the calculated horizontal frequency.

19. The apparatus of claim 15, wherein the processor is further configured to convert the digital video signal to the analog video signal to include a bandwidth of a color difference frequency signal of the analog video signal in a bandwidth of a luminance frequency signal of the analog video signal.

* * * * *